(12) United States Patent
Gruhlke et al.

(10) Patent No.: US 7,295,329 B2
(45) Date of Patent: Nov. 13, 2007

(54) POSITION DETECTION SYSTEM

(75) Inventors: Russell W. Gruhlke, Fort Collins, CO (US); Rene P. Helbing, Palo Alto, CA (US)

(73) Assignee: Avago Technologies ECBU IP (Singapore) Pte Ltd, Singapore (SG)

( * ) Notice: Subject to any disclaimer, the term of this patent is extended or adjusted under 35 U.S.C. 154(b) by 188 days.

(21) Appl. No.: 11/222,258

(22) Filed: Sep. 8, 2005

(65) Prior Publication Data

US 2007/0052692 A1    Mar. 8, 2007

(51) Int. Cl.
G01B 11/14    (2006.01)
G01N 21/86    (2006.01)
G06M 7/00    (2006.01)

(52) U.S. Cl. ............... 356/614; 356/621; 250/559.19; 250/221

(58) Field of Classification Search ........ 356/601–625, 356/631–636, 638; 250/559.12, 559.13, 250/559.24, 559.19, 222.2; 340/555–557
See application file for complete search history.

(56) References Cited

U.S. PATENT DOCUMENTS

| | | | | |
|---|---|---|---|---|
| 4,703,316 A | * | 10/1987 | Sherbeck ................... 345/175 |
| 4,880,991 A | * | 11/1989 | Boehnlein et al. ..... 250/559.24 |
| 4,890,500 A | * | 1/1990 | Giles ........................ 73/861.41 |
| 4,912,316 A | * | 3/1990 | Yamakawa ................... 250/221 |
| 4,949,972 A | * | 8/1990 | Goodwin et al. ........... 273/371 |
| 5,200,409 A | * | 4/1993 | Romer et al. ................ 514/250 |
| 5,220,409 A | * | 6/1993 | Bures ......................... 356/621 |
| 5,383,022 A | * | 1/1995 | Kaser ......................... 356/640 |
| 5,635,724 A | * | 6/1997 | Higgins ................. 250/559.19 |
| 5,988,645 A | * | 11/1999 | Downing .................... 273/348 |
| 6,922,254 B2 | * | 7/2005 | Blohm et al. ............... 356/638 |

\* cited by examiner

*Primary Examiner*—Sang H Nguyen

(57) ABSTRACT

A position detection system. In representative embodiments, the position detection system comprises a support structure having a cavity, a first light source configured to emit light into at least part of the cavity, a second light source configured to emit light into at least part of the cavity, a first image sensor configured to capture at least part of the light emitted into the cavity by the first and second light sources, an article moveable relative to the support structure, a protuberance attached to the article, and a computation circuit configured to receive a signal from the first image sensor. Movement of the support structure moves the protuberance within the cavity. The computation circuit is configured to compute the location of the protuberance from shadows cast by the protuberance onto the first image sensor.

21 Claims, 7 Drawing Sheets

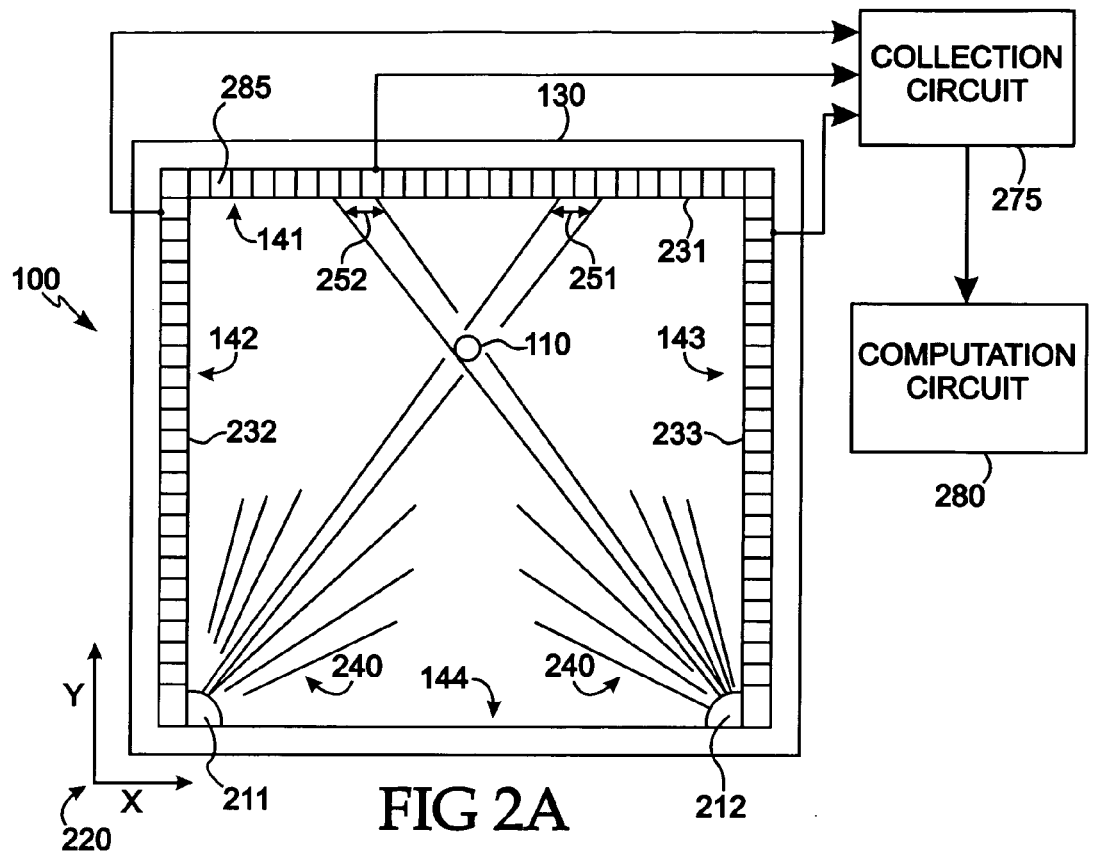
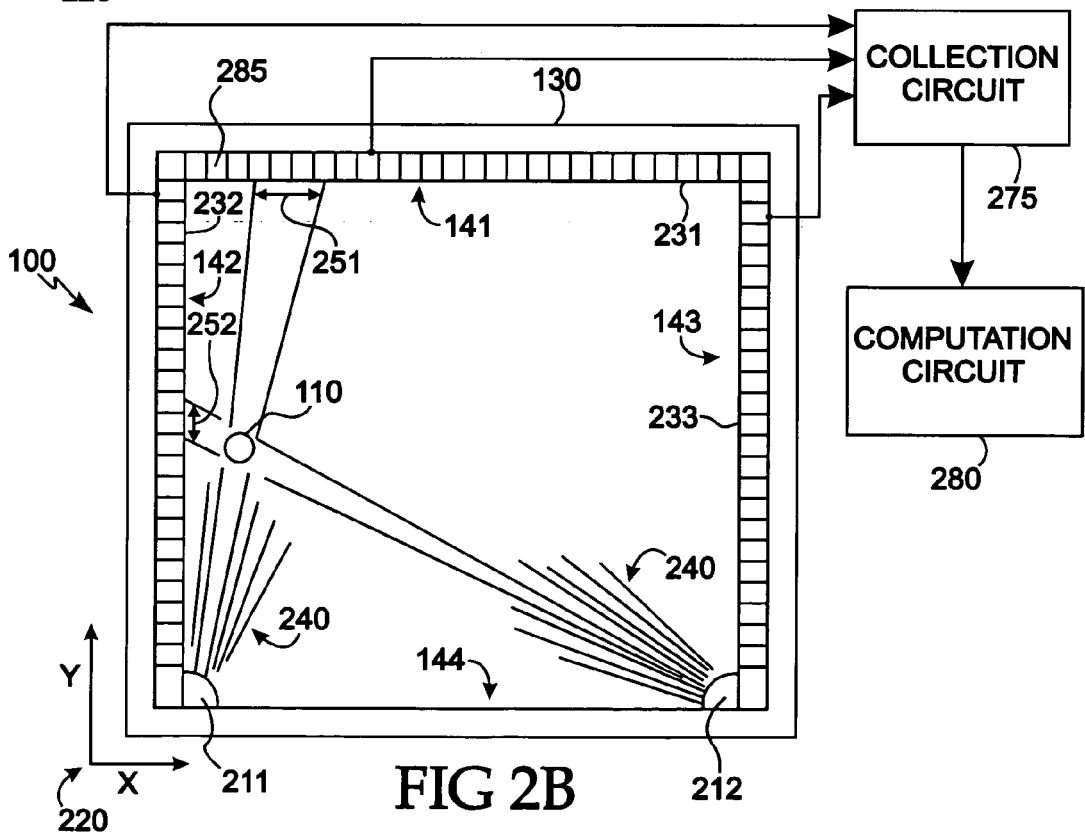

POSITION DETECTION SYSTEM

BACKGROUND

A pointing device is a common component of a computer system by which an operator can control the computer using its graphical user interface (GUI). Various pointing devices have been developed over the years including joysticks, trackballs, mechanical mice, lightpens, and more recently optical mice for this purpose. In addition there are various types of digitizing tablets which typically employ a stylus.

The main goal of these pointing devices is to translate the motion of an operator's hand into signals that the computer can use. This is accomplished by displaying a cursor on the screen of the computer's monitor with the cursor moving in response to the user's hand movement. Commands that can be selected by the user are typically keyed to the location of the cursor. The desired command can be selected by first placing the cursor, via movement of the pointing device, at the appropriate location on the screen and then activating a button or switch on the pointing device.

Positional control of cursor placement on the monitor screen was initially obtained by mechanically detecting the relative movement of a joystick or a mouse with respect to a fixed frame of reference, which for a mouse could be the top surface of a desk or a mouse pad. A common technique is to use a ball inside the mouse which in operation touches the desktop or other surface and rolls when the mouse moves. Inside the mouse there are two rollers which touch the ball and roll as the ball rolls. One of the rollers is oriented so that it detects motion in a nominal X direction, and the other is oriented 90 degrees to the first roller so it detects motion in the associated Y direction. The rollers are connected to separate shafts, and each shaft is connected to a separate optical encoder which outputs an electrical signal corresponding to movement of its associated roller. This signal is appropriately encoded and sent typically as binary data to the computer which in turn decodes the signal it receives and moves the cursor on the computer screen by an amount corresponding to the physical movement of the mouse.

More recently, optical navigation techniques have been used to produce the motion signals that are indicative of relative movement along the directions of coordinate axes. These techniques have been used, for instance, in optical computer mice to replace conventional mice and trackballs, again for the position control of screen pointers in windowed user interfaces for computer systems. Such techniques have several advantages, among which are the lack of moving parts that accumulate dirt and that suffer from mechanical wear and tear.

Motion in a system using optical navigation techniques is measured by tracking the relative displacement of a series of images. First, a two dimensional view of an area of the reference surface is focused upon an array of photo detectors, whose outputs are digitized and stored as a reference image in a corresponding array of memory. A brief time later a second image is digitized. If there has been no motion, then the pattern of the image obtained subsequent to the reference image and the pattern of the reference image are essentially identical. If, on the other hand, there has been some motion, then the pattern of the subsequent image will have been shifted along the axis of motion with the magnitude of the shift of the pattern of the image corresponding to the magnitude of physical movement of the array of photosensors. The optical mouse used in place of the mechanical mouse for positional control in computer systems employs this technique.

In practice, the direction and magnitude of movement of the optical mouse can be measured by comparing the pattern of the reference image to a series of shifted versions of the pattern of the second image. The shifted image corresponding best to the actual motion of the optical mouse is determined by performing a cross-correlation between the reference image and each of the shifted second images with the correct shift most likely providing the largest correlation value. Subsequent images can be used to indicate subsequent movement of the optical mouse using the method just described. Optical navigation sensors operate by obtaining a series of images of an underlying surface. This surface has a micro texture. When this micro texture is illuminated, an image is obtained for comparison and movement detection.

Another recent device is the touchpad which was originally developed for use with laptop computers. Touchpads are sensitive to the touch of a user's finger. They permit a user to move a cursor on the computer screen merely by moving a fingertip across the surface of the touchpad. The presence of the user's finger is detected by an array of capacitive sensors arranged in a grid beneath the surface of the touchpad. Navigation of the cursor on the computer screen operates via capacitive coupling of the user's finger to the array of sensors. The user's finger slides over a sealed surface under which lie two layers of fine electrical conductors that are arranged in a grid and that create a surface electrical field. Touching the surface with a fingertip distorts the electrical field at that spot. The touching fingertip can be located by scanning the grid and sensing the strength of the distortion on each conductor. This technology, which is a form of capacitive-sensing, is referred to as field distortion sensing. Direction of the On Screen mouse or cursor is directly effected by movement of a person's fingertip on surface of the touchpad. Supporting software allows for customizing the acceleration of the mouse and for assigning mouse "click" and "drag-lock" functions as well. The size of such touchpads varies depending on manufacturer and model. Some are as small as a 2 inch by 2 inch rectangle.

SUMMARY

In representative embodiments, a position detection system comprises a support structure having a cavity, a first light source configured to emit light into at least part of the cavity, a second light source configured to emit light into at least part of the cavity, a first image sensor configured to capture at least part of the light emitted into the cavity by the first and the second light sources, an article moveable relative to the support structure, a protuberance attached to the article, and a computation circuit configured to receive a signal from the first image sensor. Movement of the support structure moves the protuberance within the cavity. The computation circuit is configured to compute the location of the protuberance when light from the first light source casts a first shadow of the protuberance onto the first image sensor and when light from the second light source casts a second shadow of the protuberance onto the first image sensor.

In another representative embodiment, a position detection system comprises a support structure having a cavity, a first light source configured to emit light into at least part of the cavity, a second light source configured to emit light into at least part of the cavity, a first image sensor configured to capture at least part of the light emitted into the cavity by the first and the second light sources, a second image sensor configured to capture at least part of the light emitted into the cavity by the first and the second light sources, an article moveable relative to the support structure, a protuberance attached to the article, a first lens configured to focus light from the first light source reflected back from at least one of the retro-reflectors onto the first image sensor, a second lens configured to focus light from the second light source reflected back from at least one of the retro-reflectors onto the second image sensor, and a computation circuit configured to receive a signal from the first image sensor. Movement of the support structure moves the protuberance within the cavity. The protuberance comprises multiple retro-reflectors. The computation circuit is configured to compute the location of the protuberance when light from the first light source casts a first hotspot as reflected from the protuberance onto the first image sensor and when light from the second light source casts a second hotspot as reflected from the protuberance onto the first image sensor.

In still another representative embodiment, a position detection system comprises a support structure having a cavity, a light source configured to emit light into at least part of the cavity, a first image sensor configured to capture at least part of the light emitted into the cavity by the light source, a second image sensor configured to capture at least part of the light emitted into the cavity by the light source, a first lens configured to focus light from the light source onto the first image sensor, a second lens configured to focus light from the light source onto the second image sensor, an article moveable relative to the support structure, a protuberance attached to the article, and a computation circuit configured to receive a signal from the first image sensor. Movement of the support structure moves the protuberance within the cavity. The light source is located on the protuberance. The computation circuit is configured to compute the location of the protuberance when light from the light source is focused by the first lens onto the first image sensor and when light from the light source is focused onto the second image sensor.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

FIG. 2A is a drawing of a top view of the position detection system of FIG. 1.

FIG. 2B is a drawing of another top view of the position detection system of FIG. 1.

DETAILED DESCRIPTION

Figure 1:
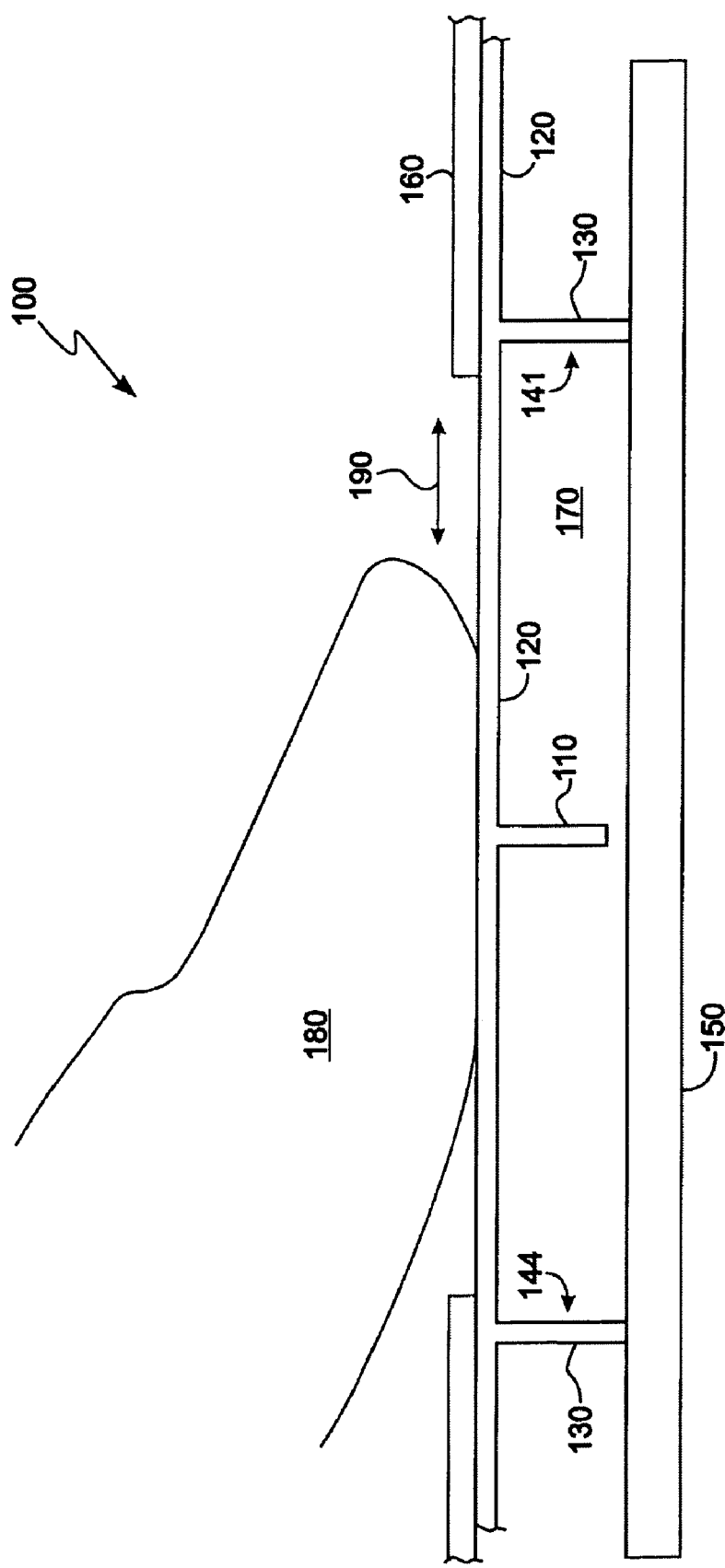
FIG. 1 is a drawing of a side view of a position detection system as described in various representative embodiments.

As shown in the drawings for purposes of illustration, representative embodiments of a novel position detection system are disclosed herein. Various navigation devices such as joysticks, trackballs, mechanical mice, lightpens, optical mice, and digitizing tablets have been used to drive a cursor on the screen of a computer. However, in miniature, electronic commercial products such as cell phones, mechanical rocker switches constitute the current navigation technology. The selection of a particular, pre-programmed electronic function is accomplished by pressing one side of a circular disk. This technology is simple and cost effective. But, its selection flexibility is limited to the four possible discrete rocker positions (up/down and left/right) which is often coupled with a miniature display. In representative embodiments, a more sophisticated navigation scheme is disclosed in which the movement of a finger can be used to drive cursor motion on a miniature display in a manner similar to that of a computer mouse.

In the following detailed description and in the several figures of the drawings, like elements are identified with like reference numerals.

FIG. 1 is a drawing of a side view of a position detection system 100 as described in various representative embodiments. In FIG. 1, the system 100 comprises a stylus 110, also referred to herein as a protuberance 110, which is attached to a cover slip 120, also referred to herein as an article 120. The cover slip 120 is in contact with and supported by a support structure 130. The support structure 130 typically has a first side 141, a second side 142, a third side 143, and a fourth side 144. Only the first and fourth sides 141,144 are shown in FIG. 1. Sides of the support structure 130 are numbered for convenience of discussion, not in sequence, around the support structure 130. The support structure 130 is supported by a base 150, and the cover slip 120 moves freely on top of the support structure 130. The cover slip 120 is held in contact with the support structure 130 by a top plate 160. The support structure 130, cover slip 120, and base 150 enclose a cavity 170 within which the stylus 110 moves as the cover slip 120 moves. Means other than the top plate 160 can be used to maintain the cover slip 120 in contact with the support structure 130. Movement of a finger 180 or other source of motive power in contact with the cover slip 120 forces the cover slip 120 to move. Representative movement is indicated by the arrows 190 shown in FIG. 1. Such movement may also be in a direction perpendicular to the drawing. The stylus 110 moves with the cover slip 120.

FIG. 2A is a drawing of a top view of the position detection system 100 of FIG. 1. In FIG. 2, a first light source 211 which could be a first light emitting diode (LED) 211 is located in a corner at the intersection of the second side 142 and the fourth side 144, and a second light source 212 which could be a second light emitting diode (LED) 212 is located in a corner at the intersection of the third side 143 and the fourth side 144. For convenience a reference coordinate system 220 is shown with X-axis parallel to the first and fourth sides 141,144 and with Y-axis parallel to the second and third sides 142,143. A first image sensor 231 is located along the first side 141; a second image sensor 232 is located along the second side 142; and a third image sensor 233 is located along the third side 143. The first, second, and third image sensors 231,232,233 typically each comprise a linear array of photosensitive elements 285 only one of which is identified in FIG. 2A. The stylus 110 is shown in the cavity 170 formed by the first, second, third, and fourth sides 141,142,143,144 of the support structure 130.

In operation, the first light source 211 emits light 240 which is detected by the first and the third image sensors 231,233, and the second light source 212 emits light 240 which is detected by the first and second image sensors 231,232. Any light 240 from the first light source 211 which is blocked by the stylus 110, as located in FIG. 2A, is detected as a first shadow 251 by the first image sensor 231, and any light 240 from the second light source 212 which is blocked by the stylus 110, as located in FIG. 2A, is detected as a second shadow 252 by the first image sensor 231. Depending upon stylus location, the first shadow 251 could be detected by either the first or the third image sensor 231,233. Also, depending upon stylus location, the second shadow 252 could be detected by either the first or the second image sensor 231,232.

A collection circuit 275 collects the first and second shadows 251,252 detected by the first, second, and third image sensors 231,232,233. Detected signals are transferred from the collection circuit 275 to a computation circuit 280 for computing the position of the stylus 110. The computation circuit 280 typically computes position using triangulation.

FIG. 2B is a drawing of another top view of the position detection system 100 of FIG. 1. In FIG. 2B, the stylus 110 is positioned at a different location from that of FIG. 2A. In operation, the first light source 211 emits light 240 which is detected by the first and the third image sensors 231,233, and the second light source 212 emits light 240 which is detected by the first and second image sensors 231,232. Any light 240 from the first light source 211 which is blocked by the stylus 110, as located in FIG. 2B, is detected as a first shadow 251 by the first image sensor 231, and any light 240 from the second light source 212 which is blocked by the stylus 110, as located in FIG. 2B, is detected as a second shadow 252 by the second image sensor 232.

In other operational configurations, light 240 from the first light source 211 which is blocked by the stylus 110 may be detected as the first shadow 251 by the third image sensor 233, and light 240 from the second light source 212 which is blocked by the stylus 110 may be detected as the second shadow 252 by the first image sensor 231. And in still other operational configurations, light 240 from the first light source 211 which is blocked by the stylus 110 may be detected as the first shadow 251 by the third image sensor 233, and light 240 from the second light source 212 which is blocked by the stylus 110 may be detected as the second shadow 252 by the second image sensor 232. Placement of the stylus 110 relative to the image sensors 231,232,233 and to the light sources 211,212 determines which of the three image sensors 231,232,233 will detect which of the two shadows 251,252. Once light 240 from the light sources 211,212 illuminate the first, second, and third image sensors 231,232,233 the position of the stylus 110 can be determined from the position of the first and second shadows 251,252 and by appropriate triangulation calculations.

A collection circuit 275 collects the first and second shadows 251,252 detected by the first, second, and third image sensors 231,232,233. Detected signals are transferred from the collection circuit 275 to a computation circuit 280 for computing the position of the stylus 110. The computation circuit 280 typically computes position using triangulation.

Figure 2C:
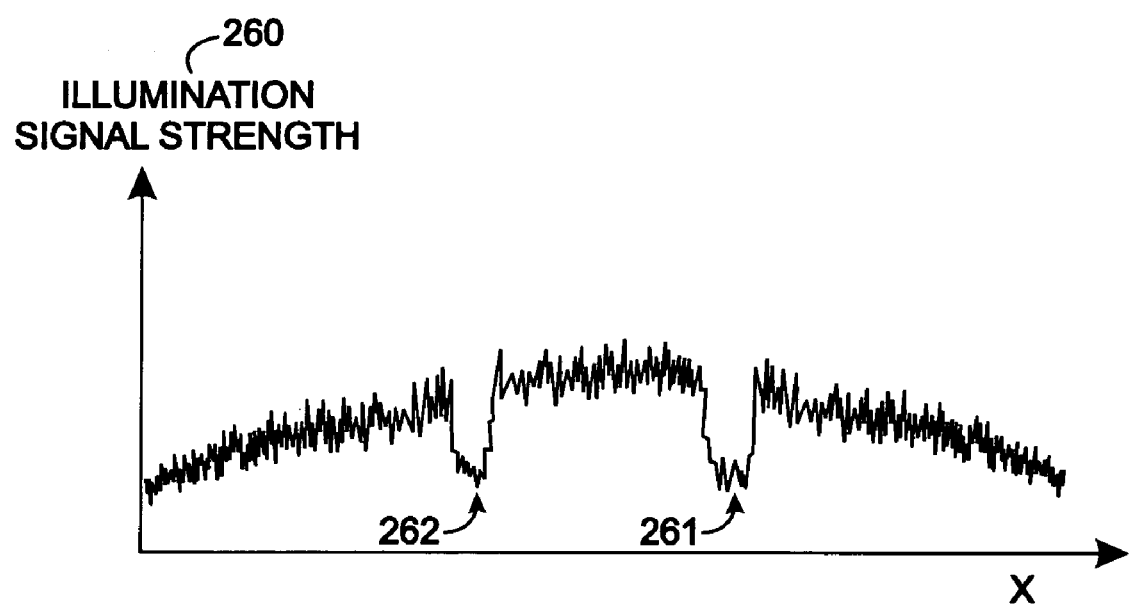
FIG. 2C is a drawing of simulated illumination signal strength from the first image sensor in FIG. 2A.

FIG. 2C is a drawing of simulated illumination signal strength 260 from the first image sensor 231 in FIG. 2A. In FIG. 2C, the first shadow 251 in FIG. 2A is detected as first signal dip 261 and second shadow 252 is detected as second signal dip 262. Random system noise is also simulated on the signal in FIG. 2C.

Figure 2D:
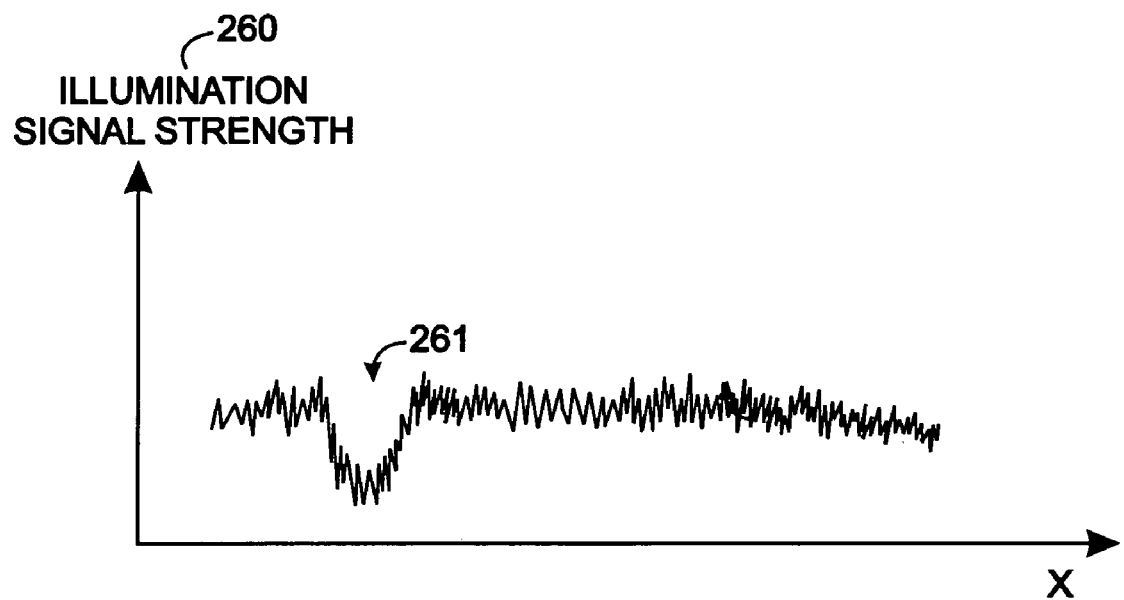
FIG. 2D is another drawing of simulated illumination signal strength from the first image sensor in FIG. 2B.
Figure 2E:
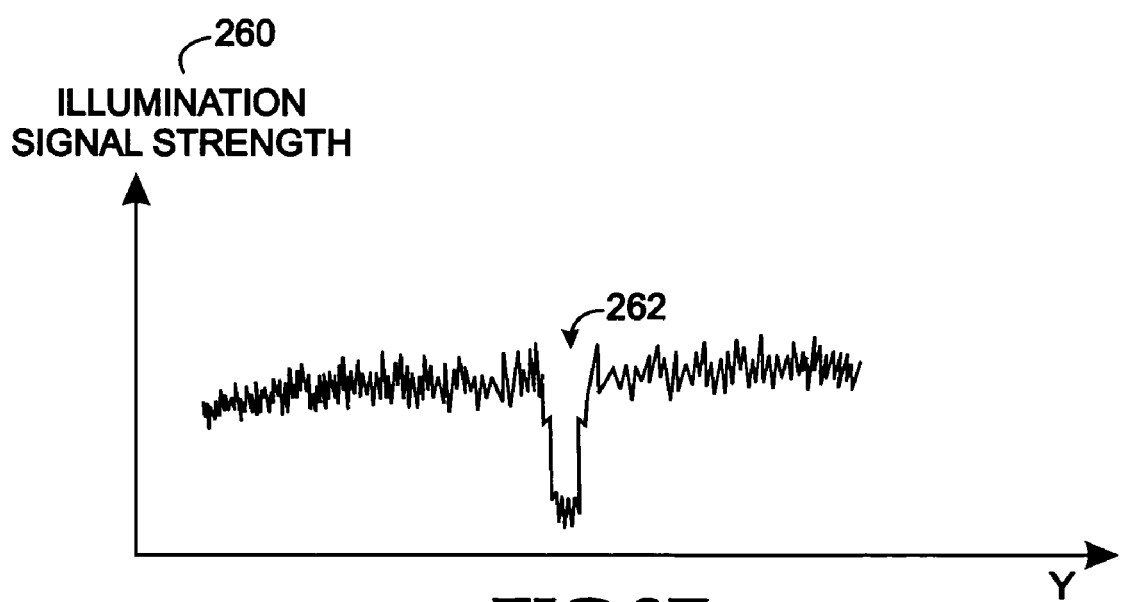
FIG. 2E is a drawing of simulated illumination signal strength from the second image sensor in FIG. 2B.

FIG. 2D is another drawing of simulated illumination signal strength 260 from the first image sensor 231 in FIG. 2B. In FIG. 2D, the first shadow 251 in FIG. 2B is detected as first signal dip 261. Random system noise is again simulated on the signal in FIG. 2D as in FIG. 2C. FIG. 2E is a drawing of simulated illumination signal strength 260 from the second image sensor 232 in FIG. 2B. In FIG. 2E, the second shadow 252 in FIG. 2B is detected as second signal dip 262. And as before, random system noise is simulated on the signal in FIG. 2E.

Figure 2F:
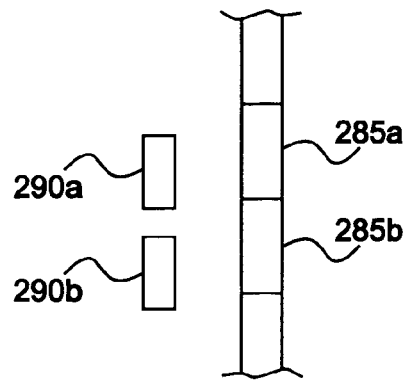
FIG. 2F is a drawing of part of a color sensitive image array for the image arrays of FIGS. 2A and 2B.

Light 240 from the second light source 212 will tend to wash out the first shadow 251 (incident on the appropriate image sensor 231,232,233) caused by light 240 from the first light source 211 being blocked by the stylus 110, and light 240 from the first light source 211 will tend to wash out the second shadow 252 (incident on the appropriate image sensor 231,232,233) caused by light 240 from the second light source 212 being blocked by the stylus 110. This problem can be aggravated by the use of light sources 211,212 that have non-uniform illumination patterns. FIG. 2F is a drawing of part of a color sensitive image array 231,232,233 for the image arrays of FIGS. 2A and 2B. This operational problem can be alleviated by using light sources 211,212 that emit light of different colors. As an example, in this representative embodiment, the first light source 211 emits light of a first color and the second light source 212 emits light of a second color. Light incident on the photosensitive elements 285 is first filtered by two sets of filters 290a,290b wherein first filters 290a pass light of the first color and block light of the second color with the passed light then detected by first photosensitive elements 285a and wherein second filters 290b pass light of the second color and block light of the first color with the passed light then detected by second photosensitive elements 285b.

Figure 2G:
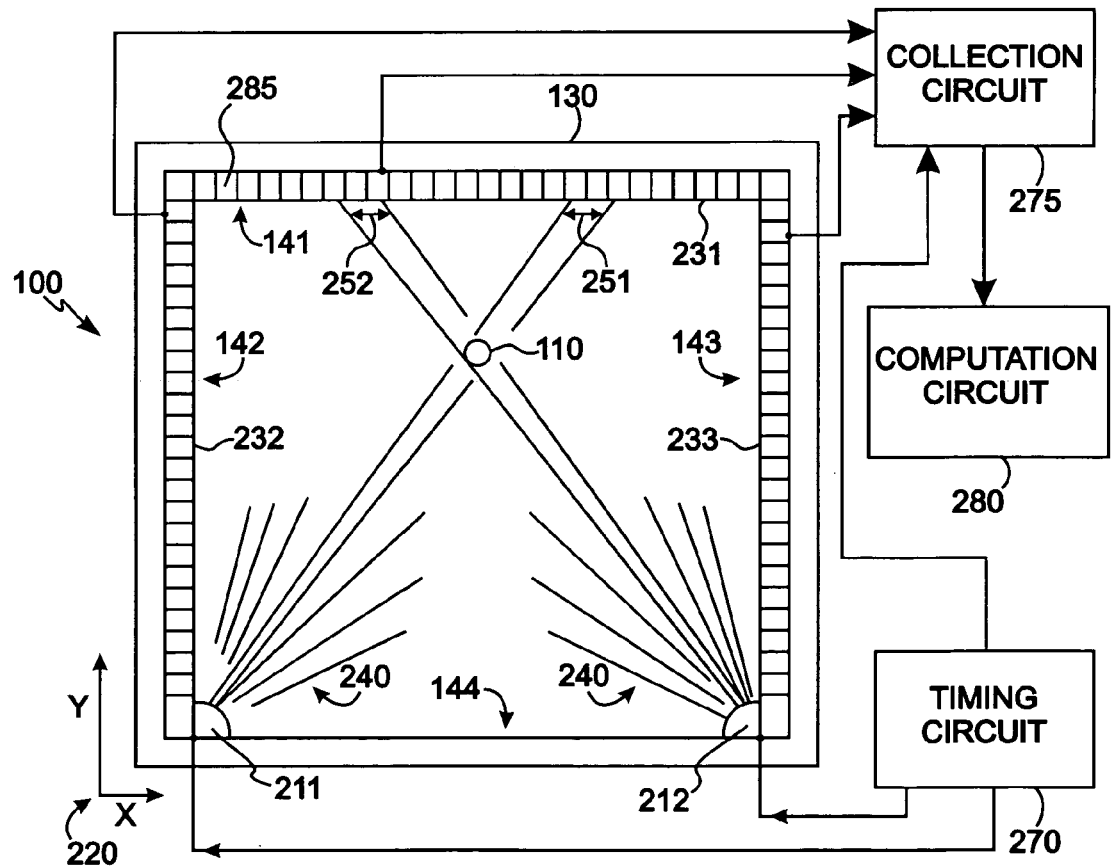
FIG. 2G is a drawing of still another top view of the position detection system of FIG. 1.

Another technique which could be used to alleviate the operational problem of light 240 from the second light source 212 tending to wash out the first shadow 251 (incident on the appropriate image sensor 231,232,233) caused by light 240 from the first light source 211 being blocked by the stylus 110 and light 240 from the first light source 211 tending to wash out the second shadow 252 (incident on the appropriate image sensor 231,232,233) caused by light 240 from the second light source 212 being blocked by the stylus 110 is shown in FIG. 2G. FIG. 2G is a drawing of still another top view of the position detection system 100 of FIG. 1. The solution of FIG. 2G is to alternate activation of the first and second light sources 211,212 in time. In such case, the first shadow 251 will be unaffected by the second light source 212, and the second shadow 252 will be unaffected by the first light source 211. An optional representative embodiment to accomplish this effort is also shown in FIG. 2B. A timing circuit 270 controls the on/off cycle of the first and second light sources 211,212 alternating between the two light sources 211,212 such that only one of the two is on at any given time. A collection circuit 275 collects the first and second shadows 251,252 detected by the first, second, and third image sensors 231,232,233. Detected signals are transferred from the collection circuit 275 to a computation circuit 280 for computing the position of the stylus 110. The computation circuit 280 typically computes position using triangulation.

A standard, commercially available, tri-color linear sensor could also be used to accomplish the separation of two wavelengths. These sensors typically have three rows of sensor pixels. There are three rows of red, green and blue color filters on top of and collocated with the three rows of sensor pixels. In this manner red shadows would occur on one row and green shadows on another.

In representative embodiments, a position detection system 100 is disclosed which comprises a support structure 130 having a cavity 170, a first light source 211 configured to emit light 240 into at least part of the cavity 170, a second light source 212 configured to emit light 240 into at least part of the cavity 170, a first image sensor 231 configured to capture at least part of the light 240 emitted into the cavity 170 by the first and the second light sources 211,212, an article 120 moveable relative to the support structure 130, a protuberance 110 attached to the article 120, and a computation circuit 280 configured to receive a signal from the first image sensor 231. Movement of the support structure 130 moves the protuberance 110 within the cavity 170, and the computation circuit 280 is configured to compute the location of the protuberance 110 when light 240 from the first light source casts a first shadow 251 of the protuberance onto the first image sensor 231 and when light 240 from the second light source 212 casts a second shadow 252 of the protuberance 110 onto the first image sensor 231.

In other representative embodiments, the protuberance 110 has a cylindrical shape, and the computation circuit 280 is configured to compute the location of the protuberance 110 using triangulation techniques. In some representative embodiments, the position detection system 100 comprises only the first image sensor 231, in other representative embodiments, the position detection system 100 comprises only the first and the second image sensors 231,232, and in still other representative embodiments, the position detection system 100 comprises the first, the second, and the third image sensors 231,232,233.

In still another representative embodiment, multiple first filters 290a are configured to pass light 240 of a first color and to block light 240 of a second color, and multiple second filters 290b are configured to pass light 240 of a second color and to block light 240 of a first color. Each image sensor 231,232,233 comprises multiple first photosensitive elements 285a and multiple second photosensitive elements 285b. Each of the multiple first filters 290a pass light 240 of a first color onto one of the first photosensitive elements 285a and block light 240 of a second color from that first photosensitive element 285a, and each of the multiple second filters 290b pass light 240 of a second color onto one of the second photosensitive elements 285b and block light 240 of a second color from that second photosensitive element 285b.

In another representative embodiment, the position detection system 100 comprises a timing circuit 270 and a collection circuit 275. The image sensors 231,232,233 comprise multiple first photosensitive elements 285a and multiple second photosensitive elements 285b. The timing circuit 270 is configured to turn-on the multiple first photosensitive elements 285a during a first time period and to turn off the multiple second photosensitive elements 285b during the first time period and is configured to turn-on the multiple second photosensitive elements 285b during a second time period and to turn off the multiple first photosensitive elements 285a during the second time period. The collection circuit 275 is configured to collect signals from the multiple first photosensitive elements 285a and to separately detect signals from the multiple second photosensitive elements 285b, and the computation circuit 280 is configured to perform the computation of the location of the protuberance 110 using the signal from the multiple first photosensitive elements 285a and using the separated signal from the multiple second photosensitive elements 285b.

In various representative embodiments, the computation circuit 280 is further configured to compute the location of the protuberance 110 when light 240 from the first light source casts a first shadow 251 of the protuberance 110 onto the first image sensor 231 and when light 240 from the second light source 212 casts a second shadow 252 of the protuberance 110 onto the second image sensor 232; the computation circuit 280 is further configured to compute the location of the protuberance 110 when light 240 from the first light source casts a first shadow 251 of the protuberance onto the second image sensor 232 and when light 240 from the second light source 212 casts a second shadow 252 of the protuberance 110 onto the second image sensor 232; the computation circuit 280 is further configured to compute the location of the protuberance 110 when light 240 from the first light source casts a first shadow 251 of the protuberance onto the first image sensor 231 and when light 240 from the second light source 212 casts a second shadow 252 of the protuberance 110 onto the second image sensor 232; the computation circuit 280 is further configured to compute the location of the protuberance 110 when light 240 from the first light source casts a first shadow 251 of the protuberance onto the third image sensor 233 and when light 240 from the second light source 212 casts a second shadow 252 of the protuberance 110 onto the first image sensor 231; the computation circuit 280 is further configured to compute the location of the protuberance 110 when light 240 from the first light source casts a first shadow 251 of the protuberance onto the second image sensor 232 and when light 240 from the second light source 212 casts a second shadow 252 of the protuberance 110 onto the second image sensor 232; the computation circuit 280 is further configured to compute the location of the protuberance 110 when light 240 from the first light source casts a first shadow 251 of the protuberance onto the third image sensor 233 and when light 240 from the second light source 212 casts a second shadow 252 of the protuberance 110 onto the third image sensor 233; and the computation circuit 280 is further configured to compute the location of the protuberance 110 when light 240 from the first light source 211 casts a first shadow 251 of the protuberance onto the second image sensor 232 and when light 240 from the second light source 212 casts a second shadow 252 of the protuberance 110 onto the third image sensor 233.

Also, in another representative embodiment, the angle between the first image sensor 231 and the second image sensor 232 is ninety degrees, and the angle between the first image sensor 231 and the third image sensor 233 is ninety degrees.

Figure 3A:
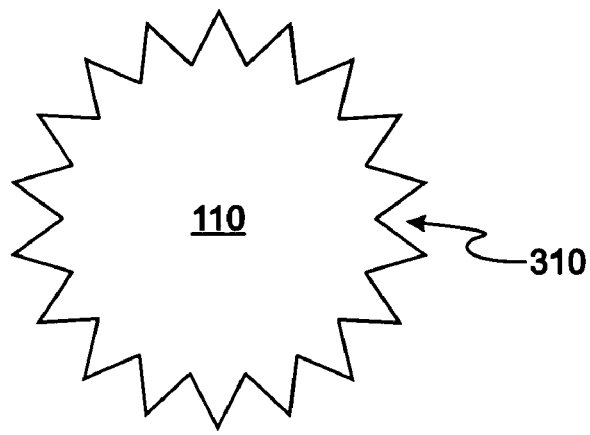
FIG. 3A is a drawing of another stylus as described in various representative embodiments.

FIG. 3A is a drawing of another stylus 110 as described in various representative embodiments. In the representative embodiment shown in FIG. 3A, the surface of the stylus 110 comprises multiple retro-reflectors 310. A retro-reflector 310 is a device that reflects light or other radiation back in the direction from which the light is incident regardless of the angle of incidence. This effect is typically obtained by the use of a set of three perpendicular mirrors which form structure referred to as a corner reflector or with a transparent sphere fabricated from a material having an index of refraction of 2. In the first case, multiple corner reflectors could be formed in the surface of the stylus 110. In the second case, multiple spheres having the appropriate index of refraction could be imbedded into the surface of the stylus 110 and partially buried therein.

Figure 3B:
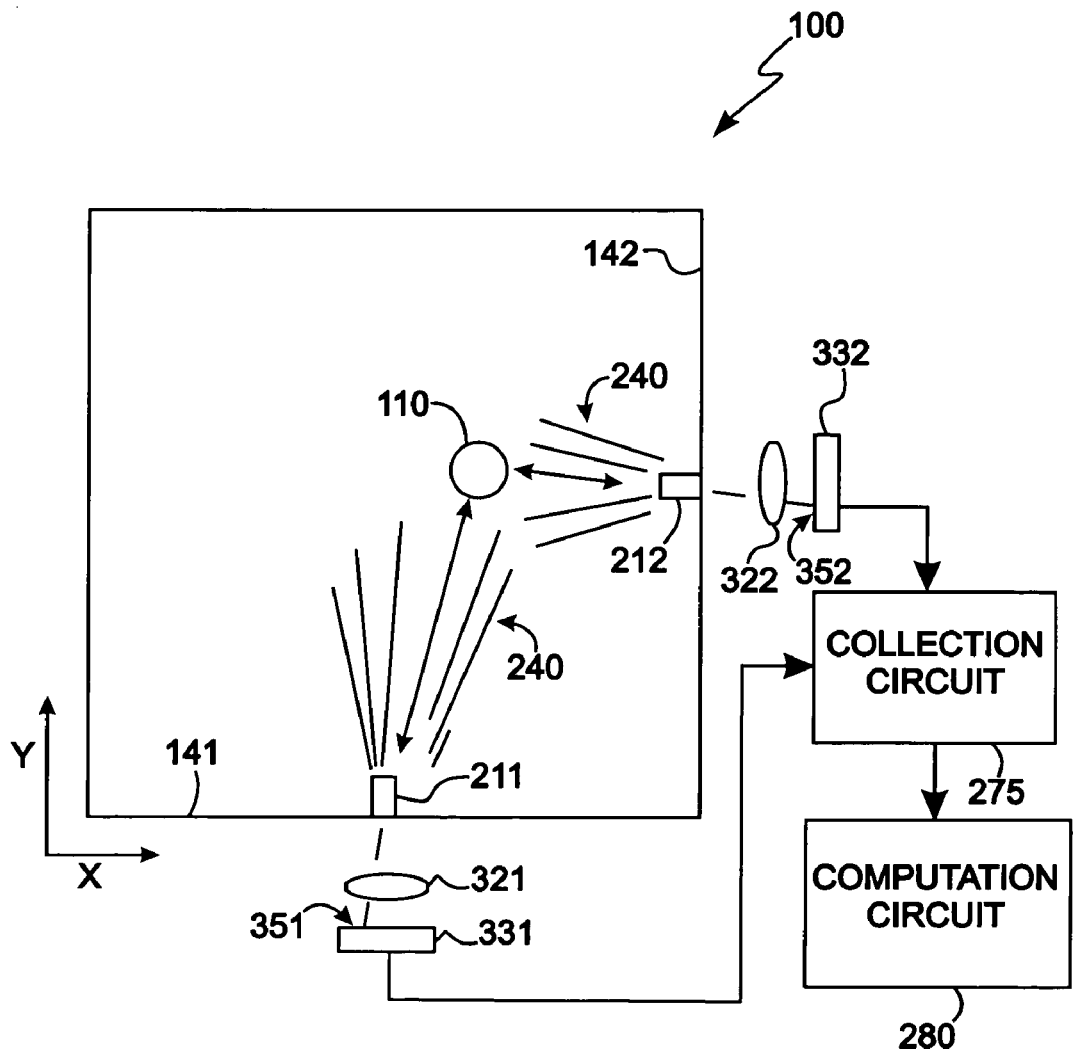
FIG. 3B is another drawing of a top view of the position detection system comprising multiple retro-reflectors on the stylus as in FIG. 3A.

FIG. 3B is another drawing of a top view of the position detection system 100 comprising multiple retro-reflectors 310 on the stylus 110 as in FIG. 3A. In the representative embodiment of FIG. 3B, light 240 is emitted by the first and second light sources 211,212 which could be, for example, first and second light emitting diodes 211,212 and which are located respectively, for example, on the first and second sides 141,142 of the support structure 130. The light 240 incident upon the stylus 110 is reflected back toward the first and second light sources 211,212 from which it emanated by the retro-reflectors 310 on the surface of the stylus 110 as shown by the double headed arrows in FIG. 3B. A portion of the reflected light 240 will be incident upon the first and second light sources 211,212 from which it emanated, but as such reflection will not be perfect in its return path, a significant amount of light 240 can be collected by a first lens 321 and a second lens 322 and then focused onto another first image sensor 331 and another second image sensor 332. Instead of shadows, the position of the stylus 110 is indicated by a first hot spot 351 on the first image sensor 331 and by a second hot spot 352 on the second image sensor 332. Due to the focusing of the a first and a second lenses 321,322, the size of the other first and second image sensors 331,332 in FIG. 3B can be significantly smaller than that of the first, second, and third image sensors 231,232,233 in FIGS. 2A and 2B. Once focused onto the first and second image sensors 331,332, the position of the stylus 110 can be determined from the position of the first and second hot spots 351,352 and by appropriate triangulation calculations. The lenses 321,322 and the other image sensors 331,332 shown in FIG. 3B are located for ease of illustration. Rather than being outside the surfaces of the first and second sides 141,142, as shown, they could lie inside the first and second sides 141,142 of the support structure 130. In addition, the location of the lenses 321,322 and the other image sensors 331,332 will generally lie behind the light sources 211,212 in FIG. 3B. Further, the lenses 321,322 could be replaced by pinholes with focusing of the light 240 onto the other image sensors 331,332 occurring as in a pinhole camera.

A collection circuit 275 collects the first and second hot spots 351,352 detected by the first and second image sensors 331,332. Detected signals are transferred from the collection circuit 275 to a computation circuit 280 for computing the position of the stylus 110. The computation circuit 280 typically computes position using triangulation.

In a representative embodiment, a position detection system 100 comprises a support structure 130 having a cavity 170, a first light source 211 configured to emit light 240 into at least part of the cavity 170, a second light source 212 configured to emit light 240 into at least part of the cavity 170, a first image sensor 231 configured to capture at least part of the light 240 emitted into the cavity 170 by the first and the second light sources 211,212, a second image sensor 232 configured to capture at least part of the light 240 emitted into the cavity 170 by the first and the second light sources 211,212, an article 120 moveable relative to the support structure 130, a protuberance 110 attached to the article 120, a first lens 321 configured to focus light 240 from the first light source 211 reflected back from at least one of the retro-reflectors 310 onto the first image sensor 231, a second lens 322 configured to focus light 240 from the second light source 212 reflected back from at least one of the retro-reflectors 310 onto the second image sensor 232, and a computation circuit 280 configured to receive a signal from the first image sensor 231. Movement of the support structure 130 moves the protuberance 110 within the cavity 170. The protuberance 110 comprises multiple retro-reflectors 310. The computation circuit 280 is configured to compute the location of the protuberance 110 when light 240 from the first light source casts a first hot spot 351 as reflected from the protuberance onto the first image sensor 231 and when light 240 from the second light source 212 casts a second hot spot 352 as reflected from the protuberance 110 onto the first image sensor 231.

Figure 4A:
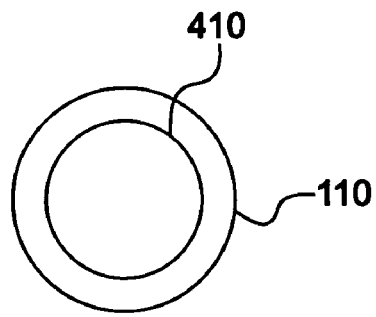
FIG. 4A is a drawing of still another stylus as described in various representative embodiments.

FIG. 4A is a drawing of still another stylus 110 as described in various representative embodiments. In the representative embodiment shown in FIG. 4A, the stylus 110 comprises a stylus light source 410 which could be, for example, stylus light emitting diode 410.

Figure 4B:
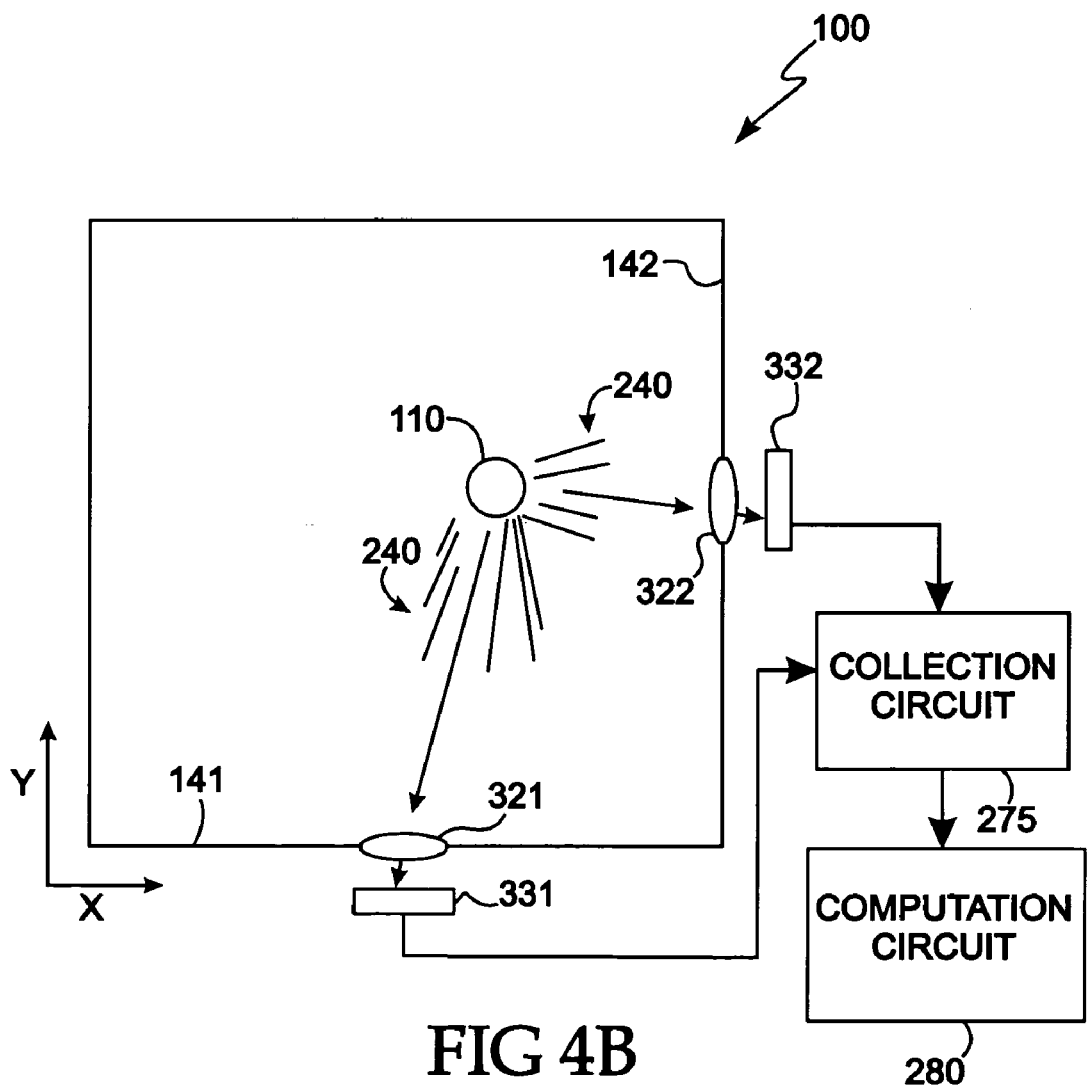
FIG. 4B is another drawing of a top view of the position detection system comprising the stylus as in FIG. 4A.

FIG. 4B is another drawing of a top view of the position detection system 100 comprising the stylus 110 as in FIG. 4A. In the representative embodiment of FIG. 4B, light 240 emitted by the stylus light source 410 is collected by the first lens 321 and the second lens 322 and then focused onto the other first image sensor 331 and the other second image sensor 332. Due to the focusing of the first and second lenses 321,322, the size of the other first and second image sensors 331,332 in FIG. 4B can be significantly smaller than that of the first, second, and third image sensors 231,232,233 in FIGS. 2A, 2B, and 2G. Once focused onto the other first and second image sensors 331,332, the position of the stylus 110 can be determined from the position of a first and second images of the stylus light source 410 focused onto the other first and second image sensors 331,332 and by appropriate triangulation calculations.

The lenses 321,322 and the other image sensors 331,332 shown in FIG. 4B are located for ease of illustration. Rather than being with the first and second lenses 321,322 in respectively the first and second sides 141,142 as shown, they could lie inside or outside the first and second sides 141,142 of the support structure 130. In addition, the location of the other image sensors 331,332 may also lie inside, in, or outside the first and second sides 141,142. Though not necessary, the light source 410 is preferably isotropic such that variations in the intensity of the light 240 detected by the other image sensors 331,332 will not vary significantly with the position of the stylus 110. As in the system 100 of FIG. 3B, the lenses 321,322 could be replaced by pinholes with focusing of the light 240 onto the other image sensors 331,332 occurring as in a pinhole camera.

A collection circuit 275 collects the images of the stylus light source 410 focused onto the first and second image sensors 331,332. Detected signals are transferred from the collection circuit 275 to a computation circuit 280 for computing the position of the stylus 110. The computation circuit 280 typically computes position using triangulation.

In a representative embodiment, the position detection system 100 comprises a support structure 130 having a cavity 170, a light source 410 configured to emit light 240 into at least part of the cavity 170, a first image sensor 231 configured to capture at least part of the light 240 emitted into the cavity 170 by the light source 410, a second image sensor 232 configured to capture at least part of the light 240 emitted into the cavity 170 by the light source 410, a first lens 321 configured to focus light 240 from the light source 410 onto the first image sensor 231, a second lens 322 configured to focus light 240 from the light source 410 onto the second image sensor 232, an article 120 moveable relative to the support structure 130, a protuberance 110 attached to the article 120, and a computation circuit 280 configured to receive a signal from the first image sensor 231. Movement of the support structure 130 moves the protuberance 110 within the cavity 170, and the light source 410 is located on the protuberance 110. The computation circuit 280 is configured to compute the location of the protuberance 110 when light 240 from the light source 410 is focused by the first lens 321 onto the first image sensor 231 and when light 240 from the light source 410 is focused onto the second image sensor 232.

Several representative embodiments have been described in the above discussion. The stylus 110 is typically a thin cylinder which in representative applications has a diameter of less than 0.5 mm which is attached to the bottom side of the cover slip 120. In such applications, the cavity 170 could be 5 to 10 mm by 5 to 10 mm, and the cover slip 120 could be offset from the base 150 by 1 to 2 mm. The cover slip 120 can be translated in two dimensions with application of finger pressure. Depending upon the particular embodiment, the location of the stylus 110 can be determined from images of shadows caused by the stylus 110 or from hot spots of the images of a light source. In either case, the center position of each shadow or light source image can be determined by the electronic readout from the light sensitive elements of the image sensors. This information can then be used for triangulation calculations which results in the x-y position of the stylus. As the stylus 110 moves, the shadows 251,252 or the images of the light source move accordingly. Thus, the x-y position of the stylus 110 can be correlated with finger 180 motion. This information is then used to "drive" a cursor on a display screen.

The cavity 170 can be shielded from ambient light by the top plate 160, the support structure 130, and the base 150, thereby reducing/eliminating interference from ambient light in the detection of the position of the stylus 110.

Various representative embodiments disclosed herein have a sophisticated navigation scheme in which the movement of a finger can be used to drive cursor motion on a miniature display in a manner similar to that of a computer mouse. Such a device is usable in cell phones and other small devices in which selection flexibility has typically been limited to the four possible discrete rocker positions (up/down and left/right) coupled with a miniature display.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A position detection system, comprising:
   a support structure having a cavity; a first light source configured to emit light into at least part of the cavity;
   a second light source configured to emit light into at least part of the cavity;
   a first image sensor configured to capture at least part of the light emitted into the cavity by the first and the second light sources;
   an article moveable relative to the support structure;
   a protuberance attached to the article, wherein movement of the article moves the protuberance within the cavity; and
   a computation circuit configured to receive a signal from the first image sensor, wherein the computation circuit is configured to compute the location of the protuberance when light from the first light source casts a first shadow of the protuberance onto the first image sensor and when light from the second light source casts a second shadow of the protuberance onto the first image sensor.

2. The position detection system as recited in claim 1, wherein the protuberance has a cylindrical shape.

3. The position detection system as recited in claim 1, wherein the computation circuit is configured to compute the location of the protuberance using triangulation techniques.

4. The position detection system as recited in claim 1, further comprising:
   a base attached to the support structure.

5. The position detection system as recited in claim 1, further comprising:
   multiple first filters configured to pass light of a first color and to block light of a second color; and
   multiple second filters configured to pass light of a second color and to block light of a first color, wherein the first image sensor comprises multiple first photosensitive elements and multiple second photosensitive elements, wherein each of the multiple first filters pass light of a first color onto one of the first photosensitive elements and block light of a second color from that first photosensitive element, and wherein each of the multiple second filters pass light of a second color onto one of the second photosensitive elements and block light of a second color from that second photosensitive element.

6. The position detection system as recited in claim 1, further comprising:
   a timing circuit, wherein the first image sensor comprises multiple first photosensitive elements and multiple second photosensitive elements, wherein the timing circuit is configured to turn-on the multiple first photosensitive elements during a first time period and to turn off the multiple second photosensitive elements during the first time period, and wherein the timing circuit is configured to turn-on the multiple second photosensitive elements during a second time period and to turn off the multiple first photosensitive elements during the second time period; and
   a collection circuit configured to collect signals from the multiple first photosensitive elements and to separately detect signals from the multiple second photosensitive elements, wherein the computation circuit is further configured to perform the computation of the location of the protuberance using the signal from the multiple first photosensitive elements and using the separated signal from the multiple second photosensitive elements.

7. The position detection system as recited in claim 1, further comprising:
   a second image sensor configured to capture at least part of the light emitted into the cavity by the first and the second light sources, wherein the computation circuit is further configured to compute the location of the protuberance when light from the first light source casts first shadow of the protuberance onto the first image sensor and when light from the second light source casts second shadow of the protuberance onto the second image sensor and wherein the computation circuit is further configured to compute the location of the protuberance when light from the first light source casts first shadow of the protuberance onto the second image sensor and when light from the second light source casts second shadow of the protuberance onto the second image sensor.

8. The position detection system as recited in claim 7, wherein the protuberance has a cylindrical shape.

9. The position detection system as recited in claim 7, wherein the computation circuit is configured to compute the location of the protuberance using triangulation techniques.

10. The position detection system as recited in claim 7, further comprising:
a base attached to the support structure.

11. The position detection system as recited in claim 7, further comprising:
multiple first filters configured to pass light of a first color and to block light of a second color; and multiple second filters configured to pass light of a second color and to block light of a first color, wherein the first image sensor and the second image sensor each comprise multiple first photosensitive elements and multiple second photosensitive elements, wherein each of the multiple first filters pass light of a first color onto one of the first photosensitive elements and block light of a second color from that first photosensitive element, and wherein each of the multiple second filters pass light of a second color onto one of the second photosensitive elements and block light of a second color from that second photosensitive element.

12. The position detection system as recited in claim 7, further comprising:
a timing circuit, wherein the first image sensor and the second image sensor each comprise multiple first photosensitive elements and multiple second photosensitive elements, wherein the timing circuit is configured to turn-on the multiple first photosensitive elements during a first time period and to turn off the multiple second photosensitive elements during the first time period, and wherein the timing circuit is configured to turn-on the multiple second photosensitive elements during a second time period and to turn off the multiple first photosensitive elements during the second time period; and
a collection circuit configured to collect signals from the multiple first photosensitive elements and to separately detect signals from the multiple second photosensitive elements, wherein the computation circuit is further configured to perform the computation of the location of the protuberance using the signal from the multiple first photosensitive elements and using the separated signal from the multiple second photosensitive elements.

13. The position detection system as recited in claim 1, further comprising:
a second image sensor configured to capture at least part of the light emitted into the cavity by the first and the second light sources; and
a third image sensor configured to capture at least part of the light emitted into the cavity by the first and the second light sources, wherein the computation circuit is further configured to compute the location of the protuberance when light from the first light source casts first shadow of the protuberance onto the first image sensor and when light from the second light source casts second shadow of the protuberance onto the second image sensor, wherein the computation circuit is further configured to compute the location of the protuberance when light from the first light source casts first shadow of the protuberance onto the third image sensor and when light from the second light source casts second shadow of the protuberance onto the first image sensor, wherein the computation circuit is further configured to compute the location of the protuberance when light from the first light source casts first shadow of the protuberance onto the second image sensor and when light from the second light source casts second shadow of the protuberance onto the second image sensor, wherein the computation circuit is further configured to compute the location of the protuberance when light from the first light source casts first shadow of the protuberance onto the third image sensor and when light from the second light source casts second shadow of the protuberance onto the third image sensor, and wherein the computation circuit is further configured to compute the location of the protuberance when light from the first light source casts first shadow of the protuberance onto the second image sensor and when light from the second light source casts second shadow of the protuberance onto the third image sensor.

14. The position detection system as recited in claim 13, wherein the protuberance has a cylindrical shape.

15. The position detection system as recited in claim 13, wherein the computation circuit is configured to compute the location of the protuberance using triangulation techniques.

16. The position detection system as recited in claim 13, further comprising:
a base attached to the support structure.

17. The position detection system as recited in claim 13, further comprising:
multiple first filters configured to pass light of a first color and to block light of a second color; and
multiple second filters configured to pass light of a second color and to block light of a first color, wherein the first image sensor, the second image sensor, and the third image sensor each comprise multiple first photosensitive elements and multiple second photosensitive elements, wherein each of the multiple first filters pass light of a first color onto one of the first photosensitive elements and block light of a second color from that first photosensitive element, and wherein each of the multiple second filters pass light of a second color onto one of the second photosensitive elements and block light of a second color from that second photosensitive element.

18. The position detection system as recited in claim 13, further comprising:
a timing circuit, wherein the first image sensor, the second image sensor, and the third image sensor each comprise multiple first photosensitive elements and multiple second photosensitive elements, wherein the timing circuit is configured to turn-on the multiple first photosensitive elements during a first time period and to turn off the multiple second photosensitive elements during the first time period, and wherein the timing circuit is configured to turn-on the multiple second photosensitive elements during a second time period and to turn off the multiple first photosensitive elements during the second time period; and a collection circuit configured to collect signals from the multiple first photosensitive elements and to separately detect signals from the multiple second photosensitive elements, wherein the computation circuit is further configured to perform the computation of the location of the protuberance using the signal from the multiple first photosensitive elements and using the separated signal from the multiple second photosensitive elements.

19. The position detection system as recited in claim 13, wherein the angle between the first image sensor and the second image sensor is ninety degrees and wherein the angle between the first image sensor and the third image sensor is ninety degrees.

20. A position detection system, comprising:
a support structure having a cavity;
a first light source configured to emit light into at least part of the cavity;
a second light source configured to emit light into at least part of the cavity;
a first image sensor configured to capture at least part of the light emitted into the cavity by the first and the second light sources;
a second image sensor configured to capture at least part of the light emitted into the cavity by the first and the second light sources;
an article moveable relative to the support structure;
a protuberance attached to the article, wherein movement of the article support structure moves the protuberance within the cavity and wherein the protuberance comprises multiple retro-reflectors;
a first lens configured to focus light from the first light source reflected back from at least one of the retro-reflectors onto the first image sensor;
a second lens configured to focus light from the second light source reflected back from at least one of the retro-reflectors onto the second image sensor; and
a computation circuit configured to receive a signal from the first image sensor, wherein the computation circuit is configured to compute the location of the protuberance when light from the first light source casts a first hotspot as reflected from the protuberance onto the first image sensor and when light from the second light source casts a second hotspot as reflected from the protuberance onto the first image sensor.

21. A position detection system, comprising:
a support structure having a cavity;
a light source configured to emit light into at least part of the cavity;
a first image sensor configured to capture at least part of the light emitted into the cavity by the light source;
a second image sensor configured to capture at least part of the light emitted into the cavity by the light source;
a first lens configured to focus light from the light source onto the first image sensor;
a second lens configured to focus light from the light source onto the second image sensor;
an article moveable relative to the support structure;
a protuberance attached to the article, wherein movement of the article moves the protuberance within the cavity and wherein the light source is located on the protuberance; and
a computation circuit configured to receive a signal from the first image sensor, wherein the computation circuit is configured to compute the location of the protuberance when light from the light source is focused by the first lens onto the first image sensor and when light from the light source is focused onto the second image sensor.

* * * * *

UNITED STATES PATENT AND TRADEMARK OFFICE
CERTIFICATE OF CORRECTION

PATENT NO. : 7,295,329 B2  Page 1 of 1
APPLICATION NO. : 11/222258
DATED : November 13, 2007
INVENTOR(S) : Russell W. Gruhlke et al.

It is certified that error appears in the above-identified patent and that said Letters Patent is hereby corrected as shown below:

Column 15, Line 24, Claim 20, after "article" delete "support structure".

Signed and Sealed this

Eighth Day of June, 2010

David J. Kappos
*Director of the United States Patent and Trademark Office*